(12) United States Patent
Patel

(10) Patent No.: US 12,370,456 B1
(45) Date of Patent: Jul. 29, 2025

(54) DRY BAG FOR GAME CONTROLLER

(71) Applicant: Nayan Arvind Patel, Brentwood, TN (US)

(72) Inventor: Nayan Arvind Patel, Brentwood, TN (US)

(*) Notice: Subject to any disclaimer, the term of this patent is extended or adjusted under 35 U.S.C. 154(b) by 259 days.

(21) Appl. No.: 18/221,045

(22) Filed: Jul. 12, 2023

Related U.S. Application Data

(60) Provisional application No. 63/389,343, filed on Jul. 14, 2022.

(51) Int. Cl.
| | | |
|---|---|---|
| A63F 13/98 | (2014.01) | |
| A45C 11/16 | (2006.01) | |
| A45C 13/00 | (2006.01) | |
| A45C 13/02 | (2006.01) | |
| A45C 11/00 | (2006.01) | |

(52) U.S. Cl.
CPC ............. *A63F 13/98* (2014.09); *A45C 11/16* (2013.01); *A45C 13/008* (2013.01); *A45C 13/02* (2013.01); *A45C 11/003* (2025.01); *A45C 2013/025* (2013.01)

(58) Field of Classification Search
CPC ....... A63F 13/98; A45C 11/16; A45C 11/003; A45C 13/008; A45C 13/02; A45C 2013/025
USPC .......................................................... 463/47
See application file for complete search history.

(56) References Cited

U.S. PATENT DOCUMENTS

| | | |
|---|---|---|
| 5,873,456 A | 2/1999 | Hull et al. |
| 6,149,305 A | 11/2000 | Fier |
| 6,915,934 B2 | 7/2005 | Hassett |
| 8,770,402 B2 | 7/2014 | Bergreen et al. |
| 9,474,980 B2 | 10/2016 | Wakitani et al. |
| 9,755,444 B2 | 9/2017 | To et al. |
| 10,194,725 B2 | 2/2019 | Lai et al. |
| 10,367,538 B2 | 7/2019 | Lai et al. |
| 10,954,055 B2 * | 3/2021 | Rogers ..................... B65D 5/36 |
| 11,272,767 B2 | 3/2022 | Collie |
| 11,425,978 B2 | 8/2022 | Chen et al. |
| 2005/0075172 A1 | 4/2005 | Coleman |
| 2007/0215663 A1 | 9/2007 | Chongson et al. |
| 2012/0262618 A1 | 10/2012 | Weakly |
| 2013/0126533 A1 * | 5/2013 | Klosky ................ H04B 1/3888 |
| | | 220/560 |

(Continued)

FOREIGN PATENT DOCUMENTS

| | | |
|---|---|---|
| CN | 108367196 A | 8/2018 |
| EP | 0997174 A1 | 5/2000 |
| JP | 2002260481 A | 9/2002 |

OTHER PUBLICATIONS

"Hardware Review: tomtoc Slim Case Generation 2 and Travel Case" by Marc Deschamps, dated Oct. 5, 2019 (Year: 2019).*

(Continued)

*Primary Examiner* — Allen Chan

(74) *Attorney, Agent, or Firm* — Shane Cortesi

(57) ABSTRACT

A dry bag for game controllers is described. The dry bag may include one or more joystick protrusions that receive the joystick(s) of the game controllers to allow the user to move (and preferably rotate) the joystick(s) while the game controller is in the dry bag. The protrusion(s) may be surrounded by an accordion fold(s) that allows movement of the joystick protrusion(s) and joystick(s) in a 360 degree manner.

20 Claims, 6 Drawing Sheets

(56) References Cited

U.S. PATENT DOCUMENTS

2013/0221048 A1 8/2013 Revels et al.
2021/0093060 A1* 4/2021 Dooling .................. F41C 33/06

OTHER PUBLICATIONS

"Accessory Review: tomtoc Nintendo Switch Cases" by Ryan Craddock, dated Oct. 15, 2018 (Year: 2018).*

* cited by examiner

DRY BAG FOR GAME CONTROLLER

BACKGROUND

Technical Field

The present invention relates to apparatuses allowing game controllers to be played in environments with water.

Background of the Invention

Game controllers are input devices used with video games or entertainment systems to provide input to a video game, typically to control an object or character in the game. Typically, game controllers include at least one joystick and at least one button. For purposes of the present invention, the term "game controllers" includes, for example, gamepads as well as handheld consoles.

There is an unmet need to play video games in the pool, hot tub and in other embodiments where the game controllers may get wet.

Conventional game controllers, however, are not waterproof.

There is a need in the art to create apparatuses allowing game controllers to be played in the water.

SUMMARY OF THE INVENTION

The present disclosure provides dry bags for game controllers.

BRIEF DESCRIPTION OF THE DRAWINGS

in FIG. 1, the dry bag top is closed but is not fastened with the buckle.

in FIG. 2, the dry bag top is open.

in FIG. 3, the dry bag top is open.

in FIG. 5, a wrist strap has been added to the dry bag.

FIG. 9 illustrates the sectional view of the buttons and the button protrusions of FIG. 7, with the joystick and joystick protrusion generally circular top being tilted; no wiring is shown in FIG. 9 for simplicity.

DETAILED DESCRIPTION

Figure 1:
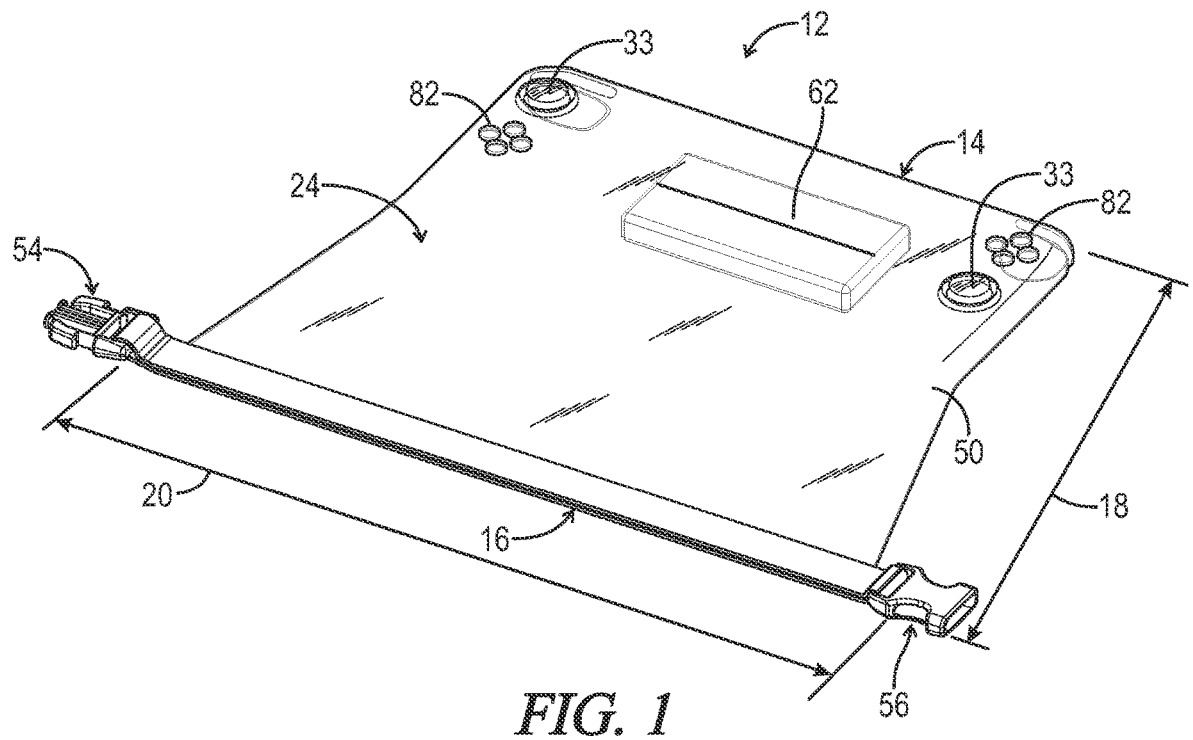
FIG. 1 illustrates a front perspective view of one embodiment of the dry bag of the present disclosure.
Figure 2:
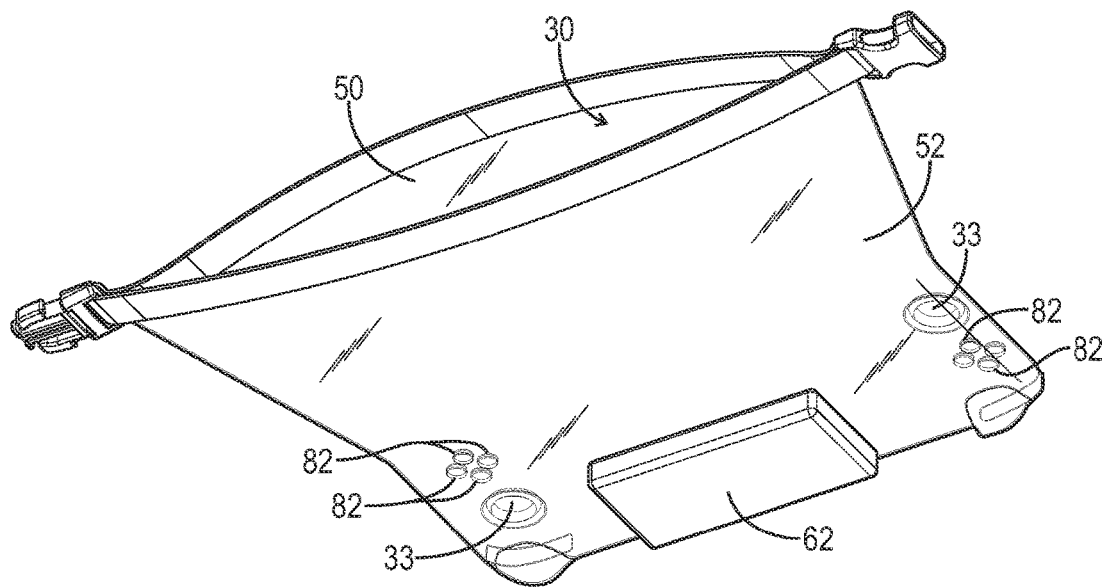
FIG. 2 illustrates a rear perspective view of the dry bag of FIG. 1.

With reference to FIGS. 1-11 the present disclosure provides a dry bag generally denoted by the numeral 12 for providing a waterproof/water-resistant environment for a game controller 10. In the drawings, not all reference are included in all drawings for clarity. In addition, the drawings are drawn to scale but other dimensions are possible.

As shown in FIGS. 1-11, like a typical dry bag, the dry bag 12 may comprise a closed bottom 14, an open top 16, a length 18 extending from the closed bottom 14 to the open top 16, a width 20 perpendicular to the length 18, a thickness 22 perpendicular to the length 18 and width 20, at least one flexible wall 24 that may extend about the length 18, width 20 and thickness 22 and provide a flexible waterproof/water-resistant barrier 26 separating a bag exterior 28 from a bag interior 30. The bag interior 30 is preferably configured to hold a game controller 10. The dry bag 12 may also include a fastener 32 that may be configured to seal the dry bag 12. As shown in FIGS. 1-11, the fastener 32 may be attached to the at least one flexible wall 24 and may be located adjacent the open top 16.

Figure 3:
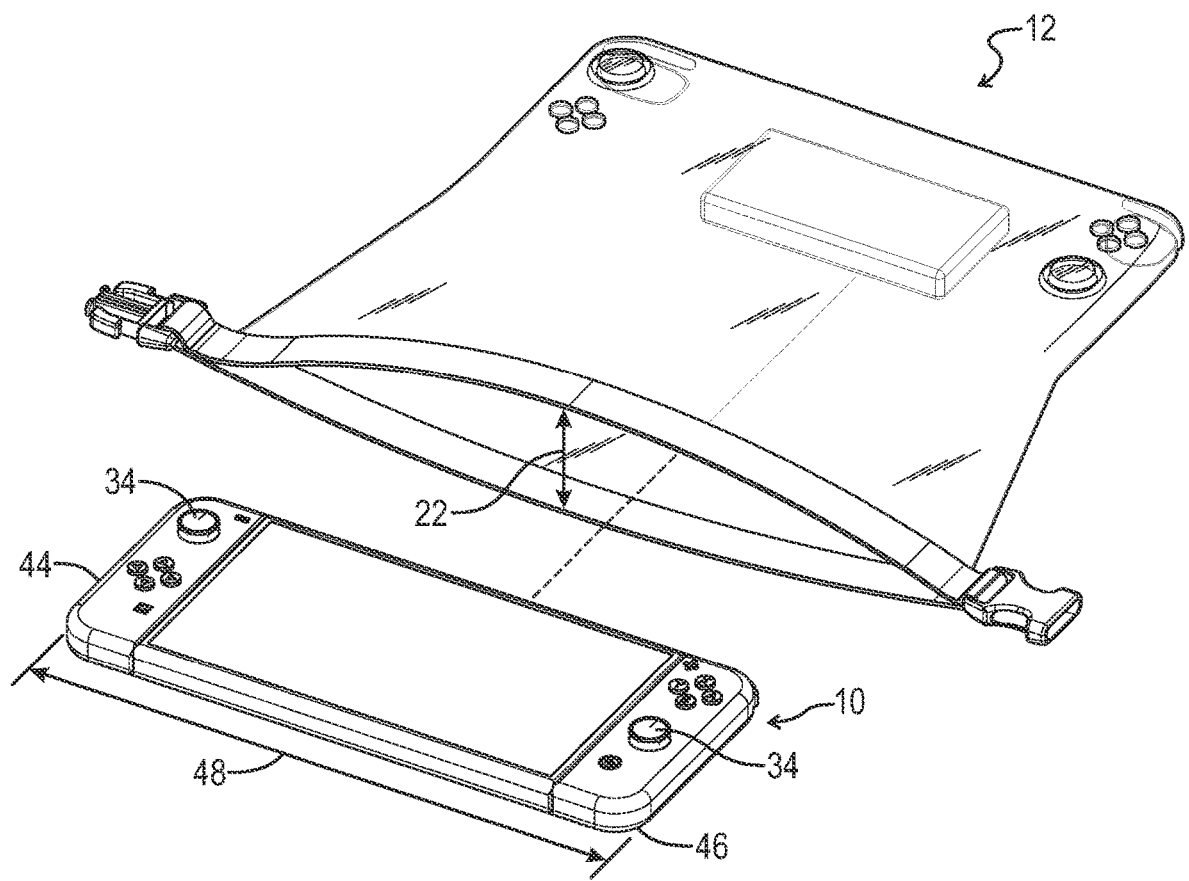
FIG. 3 illustrates a front perspective view of the dry bag of FIG. 1 together with a game controller to be inserted through the open top and into the dry bag interior.
Figure 4:
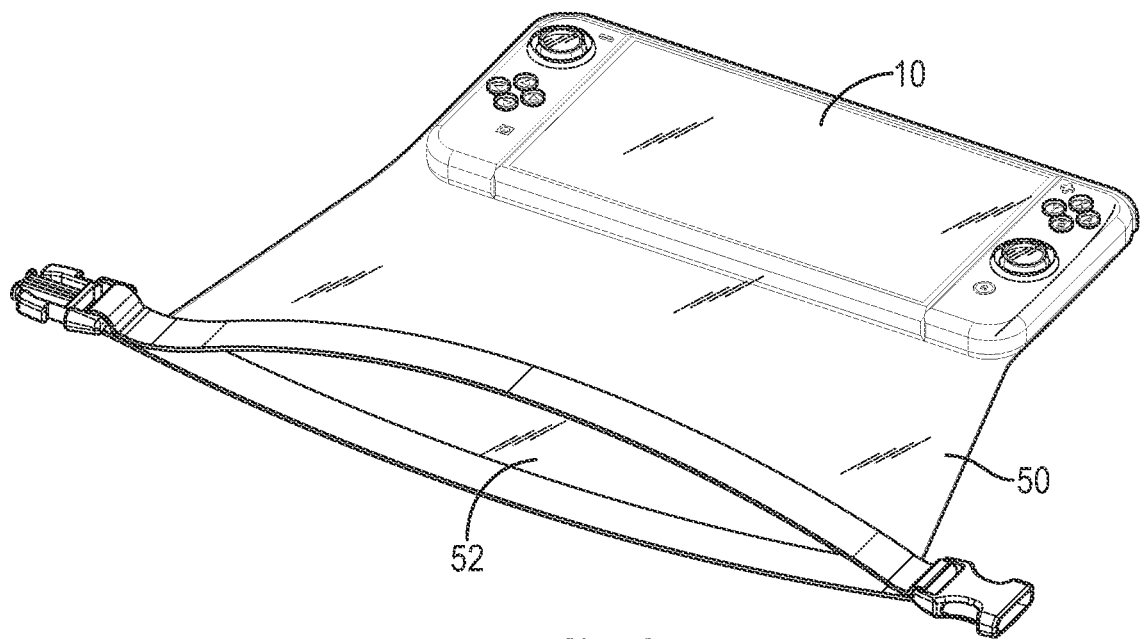
FIG. 4 illustrates a front perspective view of the dry bag and game controller of FIG. 3.
Figure 5:
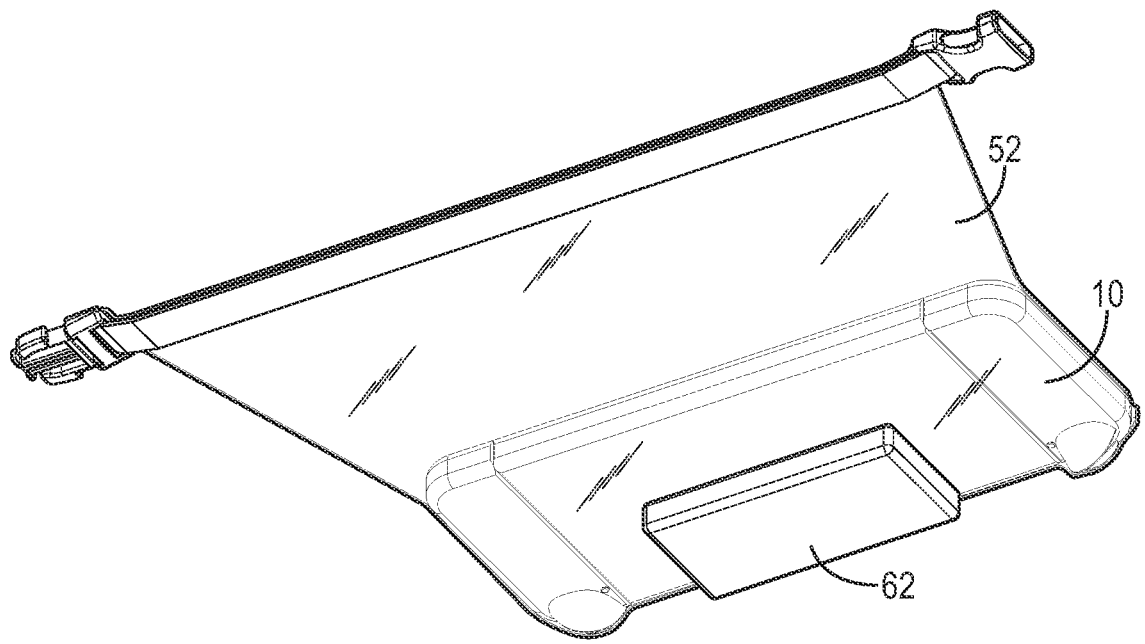
FIG. 5 illustrates a rear perspective view of the dry bag and game controller of FIG. 4.
Figure 6:
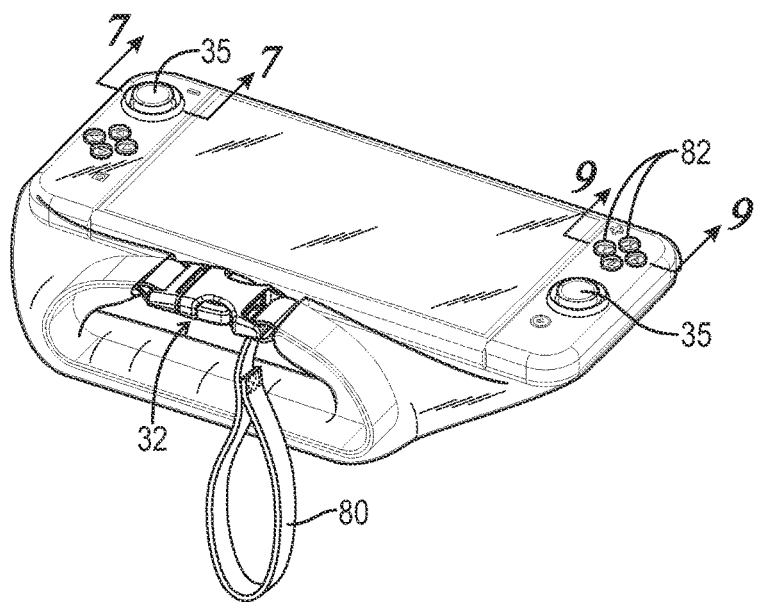
FIG. 6 illustrates a rear perspective view of the dry bag and game controller of FIG. 5 with the dry bag top closed and fastened with the buckle.

As shown in FIGS. 3-5, a user may use the dry bag 12 by inserting the game controller 10 through the open top 16 and into the bag interior 30 so that the game controller 10 confronts the bag bottom 14. Then, as shown in FIG. 6, a user may fold the open top 16 toward the closed bottom 14 and connect the fastener 32 to seal the open top 16, like a typical dry bag 12.

Optionally, as shown in FIGS. 1-11, the at least one flexible sidewall 24 is comprised of a front panel 50 and a rear panel 52. Optionally, as shown in FIGS. 1-11, the fastener is a buckle 32. Optionally, as shown in FIGS. 1-11, the front panel 50 and rear panel 52 are connected and are separated by the bag interior 30 and the buckle 32 is comprised of a buckle hook 54 (male member) and buckle receptacle 56 (female member) configured to releasably receive the hook 54 and the hook and receptacle 54/56 are connected to opposite sides of the front panel 50 and the rear panel 52.

Optionally, as shown in FIGS. 1-11, the entire at least one flexible wall 24 (or at least the portion directly in front of the game controller 10) is transparent to allow the user to see the game controller 10 in the dry bag 12.

Optionally, the game controller 10 is a wireless game controller and comprises a transmitter, which allows the game controller 10 to be played without taking the game controller 10 outside of the bag 12.

As known in the art, game controllers 10 typically include one or more joysticks 34 and/or one or more buttons 84. Optionally, preferably, unlike typical dry bags 12, as shown in FIGS. 1-11, the at least one flexible wall 24 further comprises one or more joystick protrusions 33 that extend laterally outward (i.e., away from the bag interior 30) and are configured to receive a joystick 34 and allow the user to move the respective joystick 34 within the joystick protrusion(s) 33. For example, in some embodiments, as shown in FIGS. 1-11, the joystick protrusions 33 are generally cylindrical in shape and comprise a generally circular top 35, a base 36, and a sidewall 38 located between the top 35 and the base 36. Optionally, as shown in FIGS. 1-11, the at least one flexible sidewall 24 comprises at least one accordion fold adjacent to the base 36 of each joystick protrusion 33.

Figure 7:
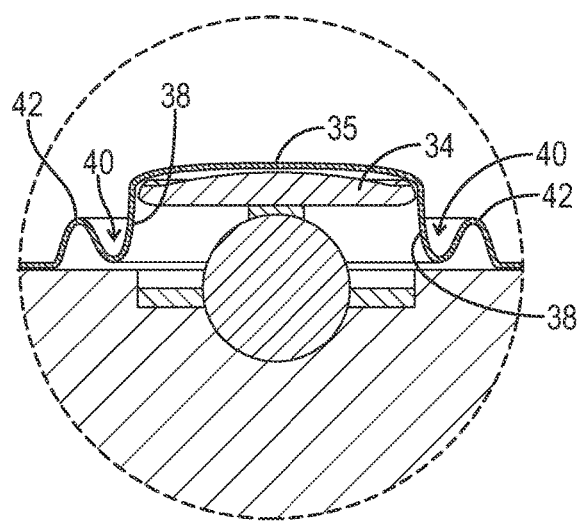
FIG. 7 illustrates a sectional view of a joystick of the game controller of FIG. 6 and a joystick protrusion of the dry bag of FIG. 6, taken along line 7-7 of FIG. 6.
Figure 8:
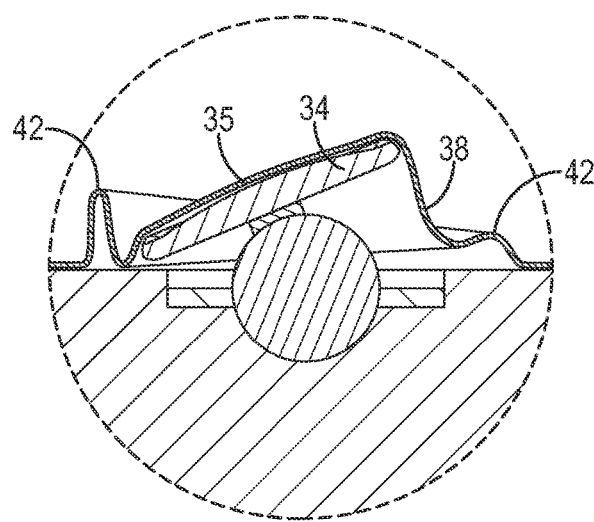
FIG. 8 illustrates the sectional view of the joystick and the joystick protrusion of FIG. 7, with the joystick and joystick protrusion generally circular top being tilted.
Figure 9:
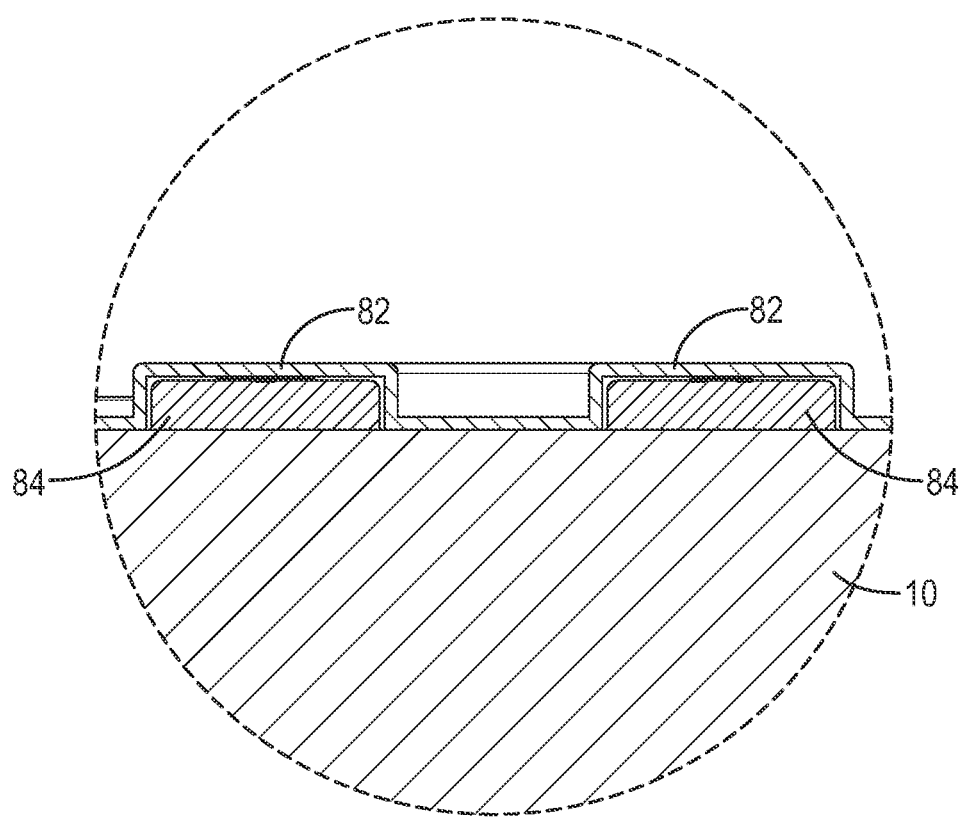
FIG. 9 illustrates a sectional view of buttons of the game controller of FIG. 6 and two button protrusions of the dry bag of FIG. 6, taken along line 9-9 of FIG. 6.
Figure 10:
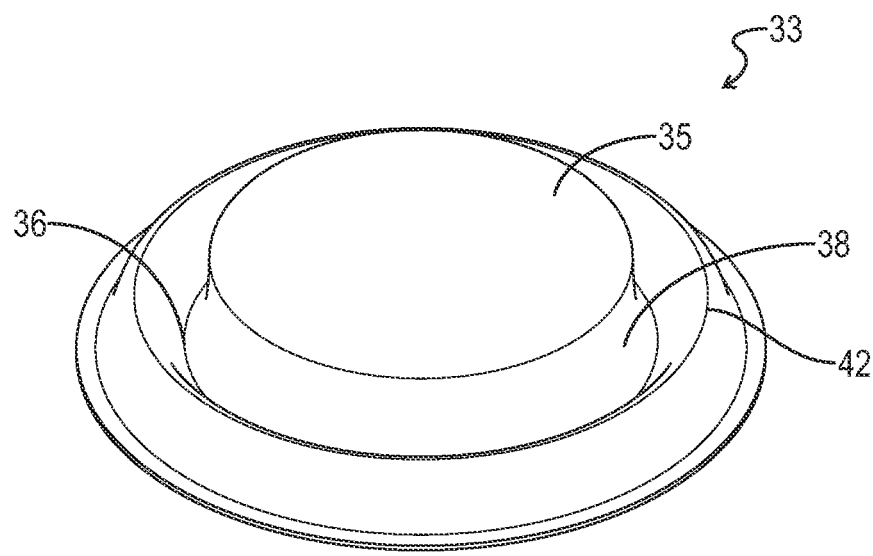
FIG. 10 illustrates a front perspective view of a joystick protrusion, circular trough, and circular ridge of the dry bag of FIG. 1.
Figure 11:
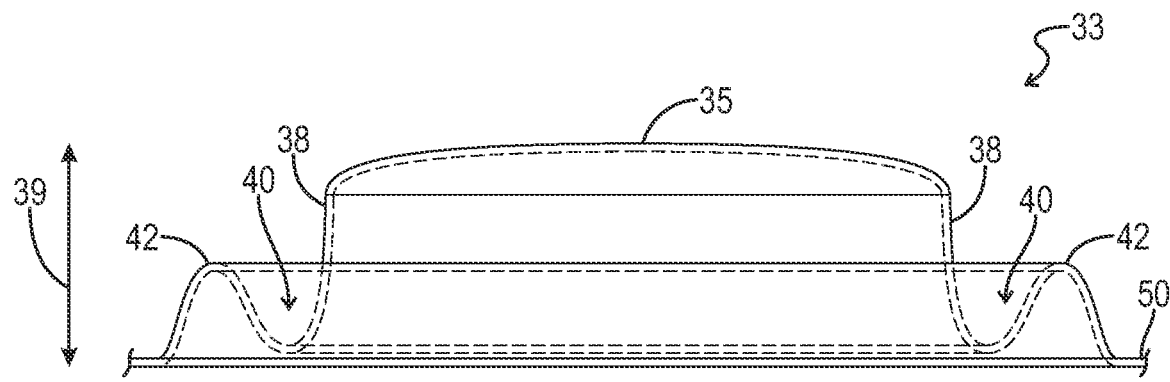
FIG. 11 illustrates a side elevation view of the joystick protrusion, circular trough, and circular ridge of the dry bag of FIG. 10.

More particularly, in some embodiments, as shown in FIGS. 1-11, the at least one flexible sidewall 24 further comprises two generally circular troughs 40, each of which extends around a circumference of the base 36 of the joystick protrusion 33, and two ridges 42, each of which extends around a circumference of a generally circular trough 40. Optionally, each generally circular top 35 is configured to tilt toward a generally circular ridge 42 in any direction about the circumference of the generally circular ridge 42 to allow 360 degree movement of the joystick 34. Optionally, the method further comprises tilting the generally circular top 35 and the joystick 34 towards a first location of the ridge 42 while in the at least one joystick protrusion 33. The movement of the joystick 34 and joystick protrusion 33 is best seen by comparing FIG. 8 with FIG. 7. Optionally, the ridge 42 comprises a height parallel to the dry bag thickness 22, the height of the ridge 42 increases at the first location of the ridge 42 as the generally circular top 35 tilts toward the first location (left ridge in FIG. 8) and, as best seen in FIG. 8, the height of the ridge 42 decreases at a second location of the ridge (right ridge in FIG. 8) located 180 degrees from the first location as the generally circular top 35 tilts away from the second location. Optionally, at rest, the ridge 42 is an inverted v-shaped accordion fold, as best seen in FIGS. 7 and 11. Optionally, the at least one joystick protrusion 33, trough 40 and ridge 42 are a single piece of material. Optionally, as best seen in FIG. 11, the joystick protrusion 33 comprises a height extending from the base 36 to the generally circular top 35 and the protrusion height is parallel to the dry bag thickness 22. Optionally, as shown in FIGS. 1-11, the at least one joystick protrusion 33 is located on the front panel 50. Optionally, the joystick protrusion 33 is closer to the bottom 14 than the open top 16.

Optionally, as shown in FIGS. 1-11, the at least one flexible wall 24 further comprises at least two button protrusions 82 extending laterally outward to receive buttons of the game controller 84 (to allow the user to push the buttons through the dry bag 12). Optionally, the button protrusions 82 are generally circular in shape. Optionally, as shown in FIGS. 1-11, at least one group of the button protrusions 82 is located between the closed bottom 14 and the joystick protrusion 33 and at least one group of the button protrusions 82 is located between the open top 16 and the joystick protrusion 33. Optionally, the joystick protrusion(s) 33 extends laterally outward to a greater degree than the button protrusions 82 (e.g., has a greater height). Optionally, the joystick 34 and button protrusions 82 are molded (in order to fit the contours of the controller 10). Optionally, the joystick protrusion(s) 33 and the button protrusions 82 have a length parallel to the length of the dry bag 12 and the length of the joystick protrusion(s) 33 is greater than the length of each of the two button protrusions 82.

Optionally, prior to inserting the game controller 10, the dry bag 12 tapers in decreasing height from adjacent the joystick protrusion 33 toward the open top 16 (e.g., from the top-most protrusion 33 to the open top 16). Optionally, prior to inserting the game controller 10, the dry bag 12 tapers in increasing width 20 from a location adjacent the closed bottom 14 toward the open top 16 (in order to allow enough slack to allow the game controller 10 be pushed into place). Optionally, prior to inserting the game controller 10, the closed bottom 14 is rectangular in shape, and the game controller 10 is generally rectangular in shape (so the dry bag 12 is form fitting around the rectangular controller 10 so air does not get trapped). Optionally, prior to inserting the game controller 10, the length 18 of the dry bag 12 is between about 8 inches and about 16 inches. Optionally, after folding the open top 16 toward the closed bottom 14 and connecting the fastener 32 to seal the open top 16 the length of the dry bag 18 is the length of the controller 10 plus approximately 1 inch to 4 inches to allow for folded up dry bag 12 and buckle 32.

Optionally, as shown in FIGS. 1-11, the dry bag 12 further comprises a floatation aid 62 connected to the rear panel 52, the floatation aid 62 is buoyant and configured to allow the dry bag 12 with included game controller 10 to float in water. Optionally, the floatation aid 62 is adjacent the open top 16.

The at least one flexible wall 24 may be comprised of any suitable material, including, for example, one or more of nylon, vinyl, polyethylene, polyvinyl chloride or such like material that provides flexibility while holding some form. Optionally, the at least one flexible wall 24 is comprised of a plurality of materials.

Optionally, as shown in FIG. 6, the dry bag 12 further comprises a loop or wrist strap 80 connected to the at least one flexible wall 24, the loop 80 configured to receive a user's wrist. Optionally, the loop 80 is located adjacent to the open top 16. Optionally the method further comprises placing a user's hand through the loop 80.

Optionally, the game controller 10 comprises a left side 44, a right side 46, and a game controller width 48 extending from the left side to the right side, and, as shown in FIG. 4, the game controller width 48 is substantially equal to the width of the closed bottom 14 (so air does not get trapped—e.g., the closed bottom width is no more than about 0.5 inches greater than the game controller width 48).

| Part List | |
|---|---|
| Game controller | 10 |
| Dry bag | 12 |
| Dry bag closed bottom | 14 |
| Dry bag open top | 16 |
| Dry bag length | 18 |
| Dry bag width | 20 |
| Dry bag thickness | 22 |
| Flexible wall | 24 |
| Flexible waterproof/water-resistant barrier | 26 |
| Dry bag exterior | 28 |
| Dry bag interior | 30 |
| Fastener/Buckle | 32 |
| Joystick protrusion | 33 |
| Joystick | 34 |
| Joystick protrusion circular top | 35 |
| Joystick protrusion base | 36 |
| Joystick protrusion flexible sidewall | 38 |
| Circular trough | 40 |
| Circular ridge | 42 |
| Game controller left side | 44 |
| Game controller right side | 46 |
| Game controller width | 48 |
| Flexible sidewall front panel | 50 |
| Flexible sidewall rear panel | 52 |
| Buckle hook | 54 |
| Buckle receptacle | 56 |
| Dry bag loop | 60 |
| Floatation aid | 62 |
| Loop/wrist strap | 80 |
| Button Protrusion | 82 |
| Controller Button | 84 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of providing a waterproof/water-resistant environment for a game controller comprising the steps of:
   a) providing a game controller, the game controller comprising at least one joystick;
   b) providing a dry bag comprising a closed bottom, an open top, a length extending from the closed bottom to the open top, a width perpendicular to the length, a thickness perpendicular to the length and width, at least one flexible sidewall providing a flexible waterproof/water-resistant barrier separating a bag exterior from a bag interior, the bag interior configured to hold the game controller, and a fastener located adjacent the open top, wherein the at least one flexible sidewall further comprises at least one joystick protrusion extending laterally outward and configured to receive the at least one joystick, wherein the at least one joystick protrusion is generally cylindrical in shape and comprises a generally circular top, a base, and a protrusion sidewall located between the top and the base, and wherein the at least one flexible sidewall further comprises a generally circular trough extending around a circumference of the base of the at least one joystick protrusion and a ridge extending around a circumference of the generally circular trough;
   c) placing the game controller in the bag interior so that the at least one joystick is located in the at least one joystick protrusion; and
   d) folding the open top toward the closed bottom and connecting the fastener to seal the open top.

2. The method of claim 1 wherein the ridge is generally circular in shape and comprises a circumference, and further wherein the generally circular top is configured to tilt toward the generally circular ridge in any direction about the circumference of the generally circular ridge to allow 360 degree movement of the at least one joystick.

3. The method of claim 1 wherein the method further comprises tilting the generally circular top and the at least one joystick towards a first location of the ridge while in the at least one joystick protrusion.

4. The method of claim 3 wherein the ridge comprises a height parallel to the dry bag thickness, wherein the height of the ridge increases at the first location of the ridge as the generally circular top tilts toward the first location and wherein the height of the ridge decreases at a second location of the ridge located 180 degrees from the first location as the generally circular top tilts away from the second location.

5. The method of claim 1 wherein the ridge is an inverted v-shaped accordion fold.

6. The method of claim 1 wherein the at least one joystick protrusion, trough and ridge are a single piece of material.

7. The method of claim 1 wherein the joystick protrusion comprises a height extending from the base to the generally circular top and further wherein the protrusion height is parallel to the dry bag thickness.

8. The method of claim 1 wherein the at least one flexible sidewall comprises at least one accordion fold adjacent to the base of the at least one joystick protrusion.

9. The method of claim 1 wherein the at least one flexible sidewall is comprised of a front panel and a rear panel.

10. The method of claim 9 wherein the at least one joystick protrusion is located on the front panel.

11. The method of claim 10 wherein the fastener is a buckle, wherein the front panel and rear panel are connected and are separated by the bag interior and further wherein the buckle is comprised of a buckle hook and buckle receptacle configured to releasably receive the hook and further wherein the hook and receptacle are connected to opposite sides of the front panel and the rear panel.

12. The method of claim 1 wherein the dry bag further comprises a floatation aid connected to the rear panel, the floatation aid buoyant and configured to allow the dry bag with included game controller to float in water.

13. The method of claim 1 wherein, in step a), the dry bag tapers in increasing width from a location adjacent the closed bottom toward the open top.

14. The method of claim 13 wherein the game controller comprises a left side, a right side, and a game controller width extending from the left side to the right side, and further wherein the game controller width is substantially equal to the width of the closed bottom.

15. The method of claim 1 wherein at least the portion of the at least one flexible sidewall located in front of the game controller is transparent.

16. The method of claim 1 wherein the entire at least one flexible sidewall is transparent.

17. The method of claim 1 wherein in step a) the closed bottom is generally rectangular in shape.

18. The method of claim 17 wherein the game controller is generally rectangular in shape, and the dry bag is form fitting around the rectangular controller so air does not get trapped.

19. The method of claim 1 wherein the at least one joystick protrusion is closer to the bottom than the open top.

20. The method of claim 1 wherein the game controller is a wireless game controller and comprises a transmitter.

* * * * *